US012554681B2

(12) United States Patent
Zhou et al.

(10) Patent No.: US 12,554,681 B2
(45) Date of Patent: Feb. 17, 2026

(54) SYSTEM AND METHOD OF UNDOING DATA BASED ON DATA FLOW MANAGEMENT

(71) Applicants: DIGIWIN CO., LTD., Shanghai (CN); DATA SYSTEMS CONSULTING CO., LTD., Taipei (TW)

(72) Inventors: Cong Zhou, Shanghai (CN); Guoxin Sun, Shanghai (CN)

(73) Assignees: DIGIWIN CO., LTD., Shanghai (CN); DATA SYSTEMS CO., LTD., New Taipei (TW)

( * ) Notice: Subject to any disclaimer, the term of this patent is extended or adjusted under 35 U.S.C. 154(b) by 248 days.

(21) Appl. No.: 18/172,315

(22) Filed: Feb. 22, 2023

(65) Prior Publication Data
US 2024/0242144 A1    Jul. 18, 2024

(30) Foreign Application Priority Data

Jan. 13, 2023  (CN) .......................... 202310070748.8

(51) Int. Cl.
*G06F 16/16*           (2019.01)
(52) U.S. Cl.
CPC ................... *G06F 16/162* (2019.01)
(58) Field of Classification Search
CPC ................................................ G06F 16/162
See application file for complete search history.

(56) References Cited

U.S. PATENT DOCUMENTS

| 8,453,112 B1* | 5/2013 | Brambley | G06F 8/71 717/113 |
|---|---|---|---|
| 10,698,767 B1* | 6/2020 | De Kadt | G06F 16/2315 |
| 11,416,294 B1* | 8/2022 | Davis | G06F 9/5005 |
| 11,947,788 B1* | 4/2024 | Reardon | G06F 3/0482 |
| 2006/0136510 A1* | 6/2006 | Voronov | G06F 40/166 707/999.203 |
| 2008/0235663 A1* | 9/2008 | Volkmer | G06F 8/71 717/120 |
| 2009/0327020 A1* | 12/2009 | de Vries | G06Q 10/06 705/7.15 |
| 2020/0167242 A1* | 5/2020 | Liu | G06F 11/1469 |

* cited by examiner

*Primary Examiner* — Marc S Somers
(74) *Attorney, Agent, or Firm* — JCIPRNET

(57) ABSTRACT

A system of undoing data and a method of undoing data based on a data flow management are provided. The system of undoing data based on the data flow management includes a display module, a project task management module, and a task engine. The display module receives an undone command, so that the project task management module performs a verification operation. When a result in response to the verification operation is a result of passing the verification operation, the project task management module generates a historical data list according to the undone command. The task engine, the project task management module, and the display module respectively delete relevant data according to the undone command and the historical data list and generate an undone result and new task information according to the deleted relevant data. The display module displays the undone result and the new task information.

6 Claims, 4 Drawing Sheets

SYSTEM AND METHOD OF UNDOING DATA BASED ON DATA FLOW MANAGEMENT

CROSS-REFERENCE TO RELATED APPLICATION

This application claims the priority benefit of China patent application no. 202310070748.8, filed on Jan. 13, 2023. The entirety of the above-mentioned patent application is hereby incorporated by reference herein and made a part of this specification.

BACKGROUND

Technical Field

The disclosure relates to a data flow processing technology; more particularly, the disclosure relates to a system of undoing data and a method of undoing data based on data flow management.

Description of Related Art

A business flow includes a plurality of task nodes. In a conventional workflow engine, each task node serves as a to-do task for users to process. Generally, when data are found to be abnormal due to a system error or human factors in the business flow, the existing solution is to have the user select the task node to be undone, whereby all data in the selected task node are undone. Besides, the system is required to re-initiate the entire task node including the undone data, and therefore normal data in the task node are required to be re-processed, which results in an increase in the user's workload and repetitive work. Therefore, the existing system and method cannot simply undo single abnormal data and data associated with the abnormal data in the task node, which raises issues of a large amount of workload and the necessity of repeatedly performing tasks without the abnormal data.

SUMMARY

The disclosure provides a system of undoing data and a method of undoing data based on data flow management, whereby data corresponding to undone data and data and records from the undone data to a current task flow node may be accurately undone.

According to an embodiment of the disclosure, a system of undoing data based on a data flow management includes a display module, a project task management module, and a task engine. The display module receives an undone command, so as to enable the project task management module to perform a verification operation. When a verification result in response to the verification operation is a result of passing the verification operation, the project task management module generates a historical data list according to the undone command. The task engine, the project task management module, and the display module respectively delete relevant data according to the undone command and the historical data list and generate an undone result and new task information according to the deleted relevant data. The display module displays the undone result and the new task information.

According to an embodiment of the disclosure, a method of undoing data includes following steps. An undone command is received by a display module; the undone command is output to the project task management module by the display module to enable the project task management module to perform a verification operation; when a verification result in response to the verification operation is a result of passing the verification operation, a historical data list is generated according to the undone command by the project task management module, and the undone command and the historical data list are output to a task engine by the project task management module; relevant data are respectively deleted by the task engine, the project task management module, and the display module according to the undone command and the historical data list; an undone result and new task information are generated by the task engine, the project task management module, and the display module according to the deleted relevant data; the undone result and the new task information are displayed by the display module.

In view of the above, the system of undoing data and the method of undoing data based on the data flow management provided in one or more embodiments of the disclosure may accurately select the data to be undone to effectively and automatically undo the data and the records between the current task flow and the undone data, which prevents the task node having no undone data from being re-executed and thus improves the overall efficiency and the control of the business flow.

To make the above more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
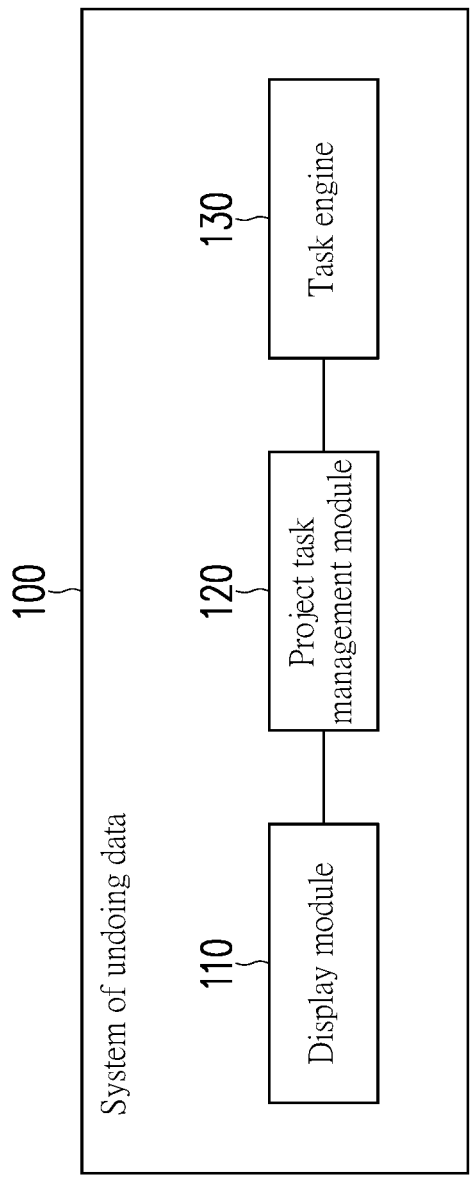
FIG. 1 is a schematic view of a system of undoing data based on a data flow management according to an embodiment of the disclosure.

Reference will now be made in detail to exemplary embodiments of the disclosure, examples of which are illustrated in the accompanying drawings. Wherever possible, the same reference numerals are used in the drawings and the description to refer to the same or similar parts.

FIG. 1 is a schematic view of a system of undoing data based on a data flow management according to an embodiment of the disclosure. With reference to FIG. 1, a system 100 of undoing data based on a data flow management includes a display module 110, a project task management module 120, and a task engine 130. The project task management module 120 is coupled to the display module 110, and the task engine 130 is coupled to the project task management module 120. The system 100 of undoing data based on the data flow management may further include a processor and a storage device. In an embodiment, the processor may be configured to execute the display module 110, the project task management module 120, and the task engine 130. The display module 110, the project task management module 120, and the task engine 130 may be, for instance, implemented in form of JavaScript Object Notation (JSON), extensible markup language (XML), yAML, or other similar programming languages, which should however not be construed as a limitation in the disclosure. The project task management module 120 may be a project task management center (PTM). The task engine 130 may be a terminal emulator. In particular, the terminal emulator is a virtual terminal on a personal computer. The virtual terminal aims at connecting a user's computer and the user to a mainframe computer (such as a host server).

The processor may be configured to execute the display module 110, the project task management module 120, and the task engine 130. Besides, the system 100 of undoing data may further include a communication interface or a data transmission interface with actual circuit components, so that the processor may communicate or perform data transmission with an external database or an external business flow system. In this embodiment, the system 100 of undoing data based on the data flow management may be implemented on cloud servers or private servers within enterprises, for instance. The system 100 of undoing data may be built on the cloud and may be configured to realize the function and the configuration of a Software as a Service (SaaS), for instance, and it may execute a plurality of application program interfaces (APIs) to call a plurality of business program modules. In an embodiment, a business program module refers to a program configured to perform a specific business function based on business data, a business flow, or task flow data, e.g., a program configured to generate a purchase order based on purchase data or a program configured to generate a purchase requisition based on purchase requisition data, which should however not be construed as a limitation in the disclosure.

In this embodiment, the system 100 of undoing data may include a processor for executing the display module 110, the project task management module 120, and the task engine 130. In another embodiment, the display module 110, the project task management module 120, and the task engine 130 may respectively include a processor for executing the display module 110, the project task management module 120, and the task engine 130, respectively. The processor may for instance, include a central processing unit (CPU) or other programmable general-purpose or special-purpose microprocessor, digital signal processor (DSP), application specific integrated circuit (ASIC), programmable logic device (PLD), other similar processing circuits, or a combination thereof.

In an embodiment, the system 100 of undoing data is configured to at least store data, settings, verification rules, and task flow data of each module. In another embodiment, the display module 110, the project task management module 120, and the task engine 130 may respectively include a storage device. The storage device may include a memory and/or a database, and the storage device may include a non-volatile memory (NVM), for instance. The storage device may store relevant programs, modules, systems, or algorithms which are configured to realize one or more embodiments of the disclosure for the processor to access and perform relevant functions and operations described in one or more embodiments of the disclosure. The storage device may store a data identifier, which is configured to demonstrate and annotate a data status or annotation content of the data; for instance, the data identifier may be an annotation of an approval by a supervisor, data checked and confirmed by a manufacturer, a work sheet which is dispatched, and any other annotation defined by responsible personnel, which should however not be construed as a limitation in the disclosure.

Figure 2:
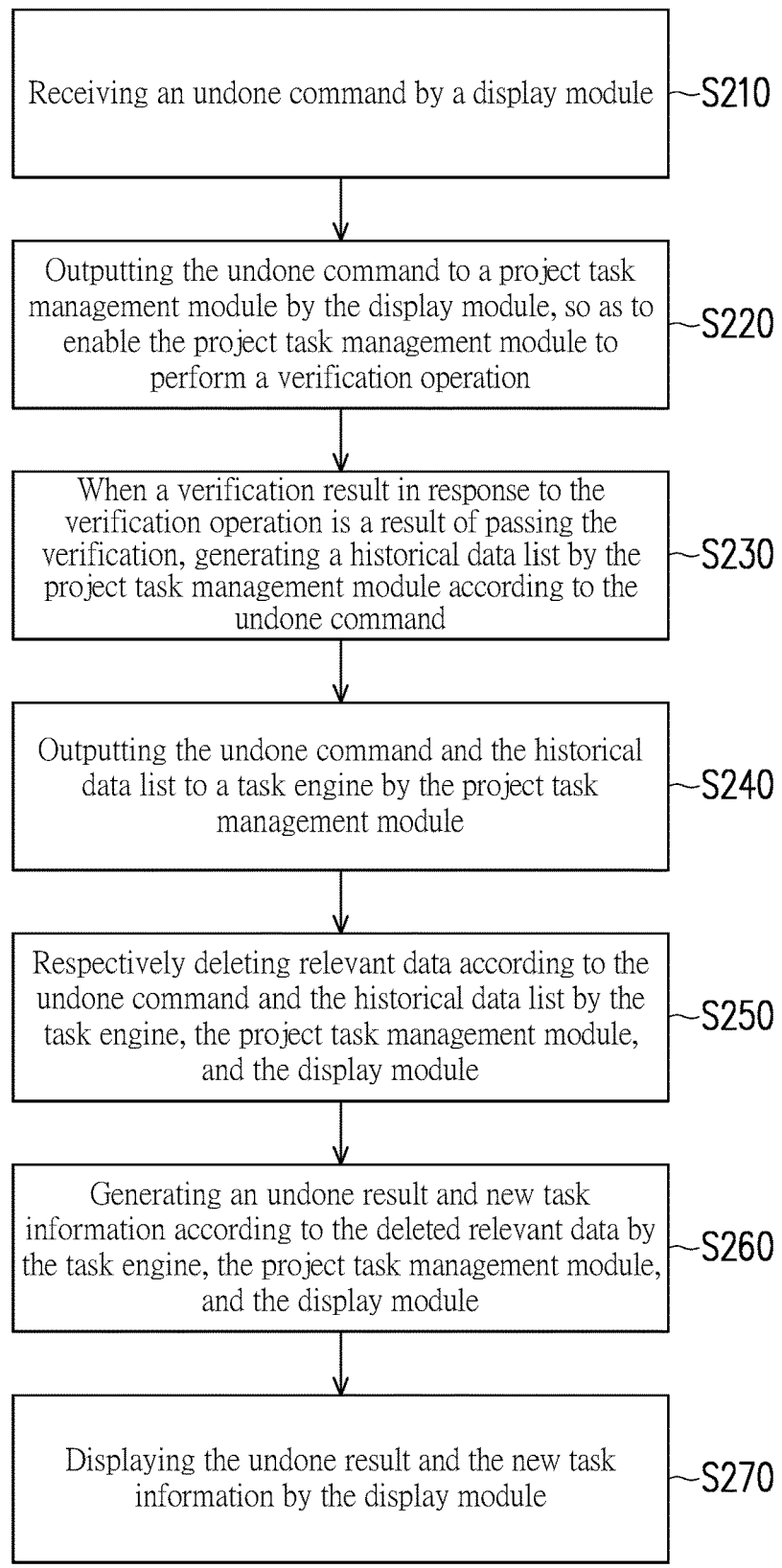
FIG. 2 is a flowchart of a method of undoing data according to an embodiment of the disclosure.

FIG. 2 is a flowchart of a method of undoing data according to an embodiment of the disclosure. With reference to FIG. 1 and FIG. 2, the system 100 of undoing data based on the data flow management performs following steps S210-S270. In step S210, an undone command is received by the display module 110. In step S220, the undone command is output to the project task management module 120 by the display module 110, so as to enable the project task management module 120 to perform a verification operation on the undone command. In this embodiment, the undone command includes the data identifier. In particular, the project task management module 120 determines whether the data identifier included in the undone command includes a condition of not passing the verification operation or an annotation of not passing the verification operation (e.g., unable to be undone, approved and signed, or checked and confirmed) in the verification rule.

For instance, when the user or a responsible person of a project observes abnormal data, abnormal settings, or abnormal task results through a display of the display module 110, a human-computer interface of the display module 110 may be operated to input the undone command to the display module 110. The human-computer interface may be a keyboard, a display, a printer, a mouse, and so forth. Next, the display module 110 outputs the undone command to the project task management module 120, so as to enable the project task management module 120 to perform the verification operation on the data corresponding to the undone command and the data identifier according to the verification rule. In particular, the verification rule may be, for instance, a list of conditions of not passing the verification operation; namely, the data identifier includes data and task project records, and when the recorded data include the condition of being unable to be undone (i.e., the condition of not passing the verification operation), the project task management module 120 determines that the data corresponding to the undone command are data that cannot be undone. On the contrary, when the data corresponding to the undone command do not include the condition of not passing the verification operation in the verification rule, the project task management module 120 determines that the undone command is a command that can be undone and then generates a verification result of passing the verification operation. For instance, when the data corresponding to the undone command or the task project has been approved and signed by the superior department or agreed by the external manufacturer, the data and the task project are data that cannot be undone; as such, after the project task management module 120 performs the verification operation, the verification result indicates that the verification operation is not passed.

In step S230, when the verification result in response to the verification operation is a result of passing the verification operation, the project task management module 120 generates a historical data list according to the undone command. In this embodiment, the project task management module 120 calls the task engine 130 (i.e., read the task flow data and the relevant data stored in the task engine 130) to obtain a data list (i.e., the historical data list) between the data corresponding to the undone command and current task data. In step S240, the project task management module 120 outputs the undone command and the historical data list to the task engine 130. In step S250, the task engine 130, the project task management module 120, and the display module 110 respectively delete relevant data according to the undone command and the historical data list. In particular, the task engine 130, the project task management module 120, and the display module 110 respectively delete the relevant data within the task engine 130, the project task management module 120, and the display module 110 (i.e., records and data respectively stored in each module) according to the historical data list and the undone data identifier in the undone command.

In step S260, the task engine 130, the project task management module 120, and the display module 110 generate an undone result and new task information according to the deleted relevant data. In particular, the task engine 130, the project task management module 120, and the display module 110 respectively delete the relevant data to generate deletion records (i.e., the undone result), and the task engine 130 updates the task flow data according to the undone command and the undone result to obtain the new task information. The task flow data are data of each task node in the business flow. For instance, the business flow is an equipment progress control flow, the undone data refer to a work sheet B of the first team and group, and the task nodes include an attendance task card of a manufacturing command, assigned work of each team and group (dispatched work sheets), a manufacturing flow of each team and group, and a status report task card of each team and group. In this exemplary embodiment, the task engine 130 generates the new task information according to the new assignment information in the undone command, where the new task information is to assign the work sheet B corresponding to the undone data to the second team and group. In step S270, the display module 110 displays the undone result and the new task information.

In this embodiment, the system 100 of undoing data based on the data flow management is able to delete relevant abnormal data and records simply through deleting the corresponding data and sending task information (the new task information), whereby the relevant data may be accurately undone. As such, by adopting the system 100 of undoing data, the issue associated with undoing only a portion of data or some of the projects in the task may be resolved. That is, the system 100 of undoing data may be applied to undo and delete a portion of the abnormal data in the task node, so as to prevent the data and the flow of the entire task node from being re-processed.

Figure 3:
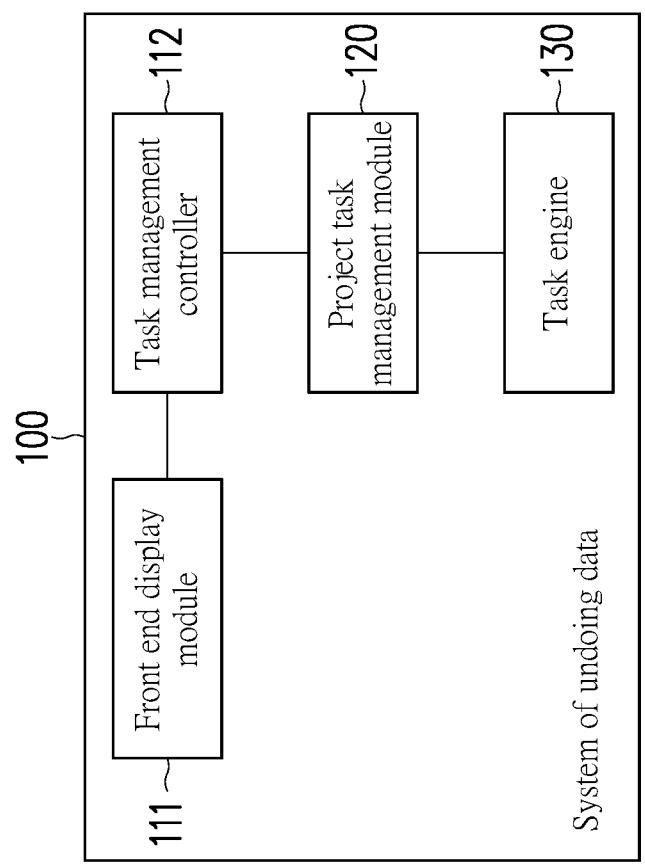
FIG. 3 is a schematic view of a system of undoing data according to an embodiment of the disclosure.
Figure 4:
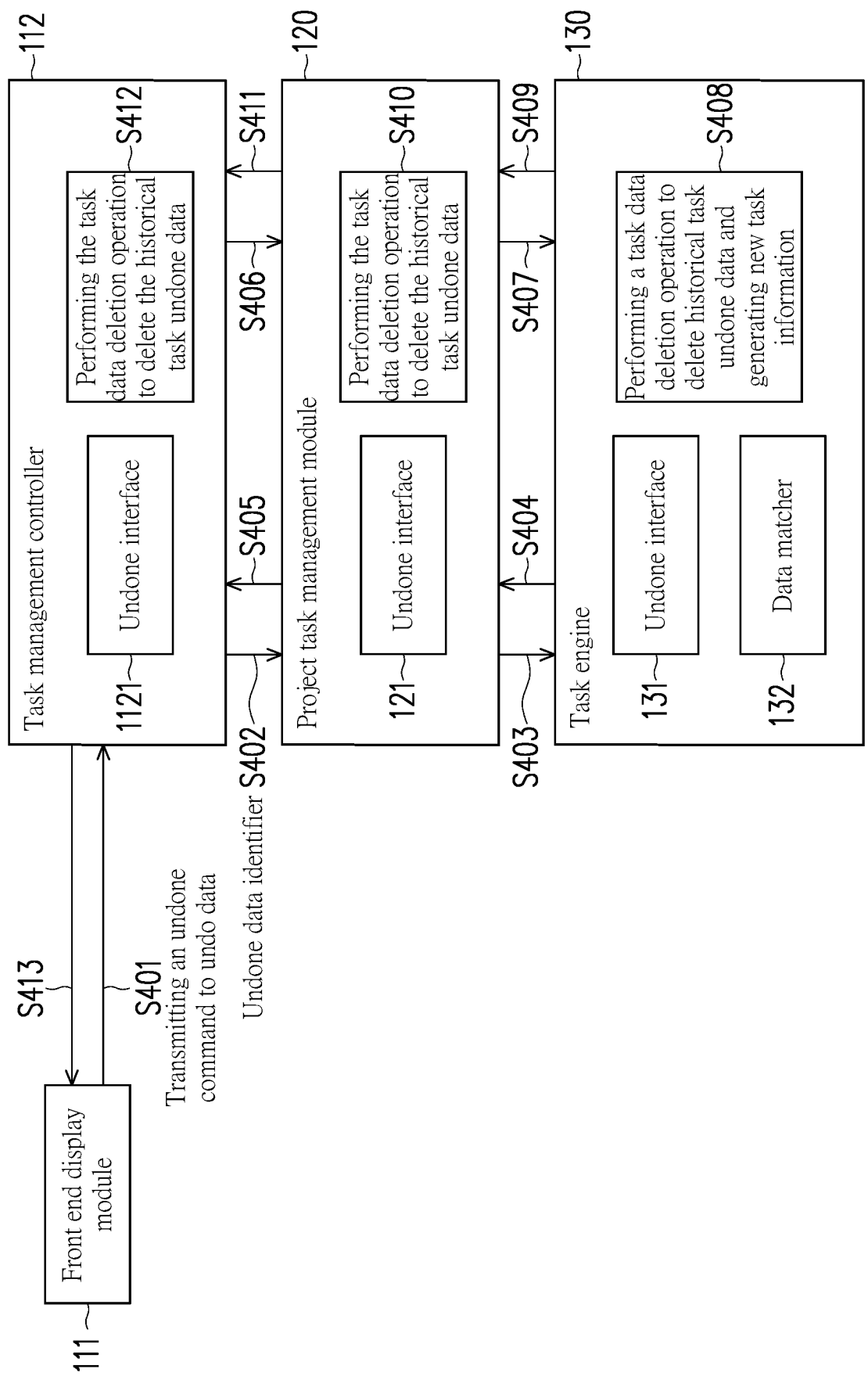
FIG. 4 is a flowchart of a method of undoing data according to an embodiment of the disclosure.

FIG. 3 is a schematic view of a system of undoing data according to an embodiment of the disclosure. FIG. 4 is a flowchart of a method of undoing data according to an embodiment of the disclosure. With reference to FIG. 3 and FIG. 4, the display module 110 includes a front end display module 111 and a task management controller 112, and the front end display module 111 may communicate with or may be connected to the human-computer interface, so that the front end display module 111 may be configured to receive the undone command input by the user. The task management controller 112 may be an automatic task management controller. The front end display module 111 may further include an input device, a user interface, a communication interface, or a data transmission interface equipped with the actual circuit elements, so that the processor may receive a command or a signal of requesting to undo the data from a data source or an external apparatus or according to operations of the user. The system 100 of undoing data based on the data flow management may perform following steps S401-S411.

In step S401, the front end display module 111 outputs an undone command (e.g., a data undone command) to the task management controller 112. An undone interface 1121 of the task management controller 112 receives the undone command, so that the task management controller 112 generates current task data and an undone data identifier according to the undone command. The undone data identifier may be a task node in the task flow corresponding to the undone data (i.e., the location in the entire flow), and the undone data identifier may also be an annotation (e.g., approved and signed by the supervisor or checked and confirmed by the manufacturer) generated after a specific step is completed (e.g., approved and signed, checked and confirmed, or unable to be undone).

In an embodiment, the undone command is transmitted in form of a task card. In particular, the project task management module 120 stores task card data and mapping relationship data between a plurality of task nodes in the task flow; thereby, the project task management module 120 obtains the task node corresponding to the undone data and the current task node according to the mapping relationship data and further generates the historical data list. The task flow data includes a plurality of task nodes. In an embodiment, the current task data may be pushed in form of a task card or data, and the current task data may be, for instance, current task card information or current task node data. The task card may be, for instance, a task notification, a change notification, a work sheet notification, or the like in the system. The current task data refer to the current task node already in process or the data information of completed tasks.

In step S402, the task management controller 112 outputs the current task data and the undone data identifier to the project task management module 120, so as to enable an undone interface 121 of the project task management module 120 to receive the undone command, the undone data identifier, and the current task data and then perform the verification operation. The verification operation is to determine by the project task management module 120 whether the undone data identifier corresponding to the undone command complies with the verification rule according to the verification rule. That is, the project task management module 120 determine a verification status of the undone data according to a verification status list and the data identifier in the verification rule.

In step S403, the project task management module 120 calls the task flow data in the task engine 130 to generate a request command including the undone data identifier and the historical data list. The request command may include a request message. The task engine 130 receives the request command through the undone interface 131, the task engine 130 then generates the historical data according to the request command through the data matcher 132, and the task engine 130 outputs the historical data to the project task management module 120 (step S404). The historical data list includes each data from the undone data corresponding to the undone data identifier to the current task data. Namely, the historical data correspond to the undone data, the current task data, and each data (i.e., the task node or the task data) from the undone data to the current task data.

In step S405, the project task management module 120 outputs the historical data and the verification result to the task management controller 112 of the display module 110, so that the task management controller 112 of the display module 110 generates a data undone command according to the undone data identifier and the historical data list. The data undone command is the undone command from the undone data to the current task. For instance, if the undone data are undone data of a task 2, and the current task in process is a task 6, then the data undone command is to undo or delete each data/record/identifier from the task 2 to the task 6.

In step S406, the task management controller 112 outputs the data undone command to the project task management module 120, and in step S407, the project task management module 120 outputs the data undone command to the task engine 130. That is, through the project task management module 120, the task engine 130 receives the data undone command from the task management controller 112.

In step S408, the task engine 130 performs a task flow data deletion operation to generate the new task information and a task flow undone result. The task flow data deletion operation is to delete the task flow data associated with the undone data and the historical data by the task engine 130. The task flow data may be, for instance, the relevant data and records of a plurality of task nodes in the business flow (i.e., the task flow). For instance, a business flow A includes a task node 1, a task node 2, a task node 3, a task node 4, and a task node 5, the task node 3 includes task data 3*a*, task data 3*b*, and task data 3*c*, the undone data are the task data 3*b*, and the current task is the task node 4. According to this exemplary embodiment, in the task flow data deletion operation, the task engine 130 deletes the data and records of the task data 3*b*, the task data 3, and the task node 4, and the new task information is the task flow data after the task flow data deletion operation is performed. For instance, the new task information is the tasks node 1, the task node 2, the task data 3*a* and the task data 3*c* of the task node 3, and the task node 5. Thereby, the user may learn the adjusted task flow data, task node, and task data by checking the new task information.

In step S409, the task engine 130 outputs the new task information and the task flow undone result of the task engine 130 to the project task management module 120, so as to enable the project task management module 120 to perform the task data deletion operation (step S410). Besides, corresponding to the execution of the task data deletion operation, the project task management module 120 generates the task undone result. The task data deletion operation is to delete by the project task management module 120 the data stored in the project task management module 120 and associated with the undone data and the historical data stored.

In step S411, the task management controller 112 of the display module 110 receives the task undone result, and the task management controller 112 of the display module 110 performs a display data deletion operation (step S412) according to the task undone result to generate the undone result. The display data deletion operation is to delete by the task management controller 112 the display data stored in the task management controller 112 and associated with the undone data and the historical data. In an embodiment, the task management controller 112 of the display module 110 stores an undone record, undone operator information, and undone data information. The undone interface (1121, 121, 131) at least defines a transmission protocol to further achieve data transmission and data reception.

In step S413, the task management controller 112 outputs the undone result and the new task information to the front end display module 111. After that, the front end display module 111 of the display module 110 displays the undone result and the new task information on a display. In this embodiment, the new task information is displayed on the display in form of task cards.

To sum up, according to one or more embodiments of the disclosure, the system 100 of undoing data and the method of undoing data based on the data flow management may simply delete the abnormal data (i.e., data corresponding to the undone command) and the relevant data according to the data identifier, the task flow data, and the mapping relationship data and further accurately undo the data, so as to effectively prevent the increase in the workload and the repetitive work resulting from the re-initiation and re-processing of the flow containing the normal data not corresponding to the undone data. That is, the system 100 of undoing data and the method of undoing data based on the data flow management may accurately undo the abnormal data and may generate the new task information according to the undone abnormal data through the task engine 130. Moreover, the system 100 of undoing data and the method of undoing data based on the data flow management may display the undone result and the new task information on the display, so that the user is able to clearly learn the undone result and the new task information after adjusting the original business flow.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A method of undoing data, comprising:
   receiving an undone command by a display module;
   outputting the undone command to a project task management module by the display module, and performing a verification operation by the project task management module upon receiving the undone command;
   in response to a verification result of the verification operation being passing the verification operation, generating a historical data list according to the undone command by the project task management module, and outputting the undone command and the historical data list to a task engine by the project task management module, wherein the verification operation is to determine by the project task management module whether an undone data identifier corresponding to the undone command complies with a verification rule, wherein the verification rule includes a list of conditions of not passing the verification operation;
   respectively deleting relevant data accurately according to the undone command and the historical data list upon receiving the historical data list by the task engine, the project task management module, and the display module, so as to prevent the data and a flow of an entire task from being re-processed;
   generating an undone result and new task information according to the deleted relevant data by the task engine, the project task management module, and the display module;
   in response to recorded data comprising a condition of not passing the verification operation, the project task management module generates a result of not passing the verification operation as the verification result;
   in response to the data corresponding to the undone command do not comprise the conditions of not passing the verification operation, the project task management module generates a result of passing the verification operation as the verification result;
   storing task card data and mapping relationship data between a plurality of task nodes in a task flow by the project task management module;

obtaining a task node of the task nodes corresponding to the undone data and a current task node according to the mapping relationship data by the project task management module to obtain the historical data list, wherein task flow data comprise the task nodes;

displaying the undone result and the new task information on a display by the display module, wherein task data are the task card data.

2. The method according to claim 1, wherein the step of outputting the undone command by the display module to the project task management module to enable the project task management module to perform the verification operation comprises:

receiving the undone command by a front end display module;

outputting the undone command to a task management controller by the front end display module, so that the task management controller generates current task data and the undone data identifier according to the undone command; and outputting the current task data and the undone data identifier to the project task management module by the task management controller, so that the project task management module performs the verification operation.

3. The method according to claim 1, wherein the step of generating the historical data list according to the undone command by the project task management module and outputting the undone command and the historical data list to the task engine by the project task management module comprises:

when a verification result in response to the verification operation is a result of passing the verification operation, calling task flow data in the task engine by the project task management module to generate a request command comprising the undone data identifier and the historical data list, generating historical data according to the request command by a data matcher and outputting the historical data to the project task management module, wherein the historical data list comprises each data from the undone data corresponding to the undone data identifier to current task data, wherein the historical data correspond to the undone data, the current task data, and each data from the undone data to the current task data.

4. The method according to claim 3, further comprising: outputting the historical data and the verification result to the display module by the project task management module, so that the display module generates a data undone command according to the undone data identifier and the historical data list, wherein the step of respectively deleting the relevant data according to the undone command and the historical data list by the task engine, the project task management module, and the display module to generate the undone result and the new task information comprises:

receiving the data undone command by the task engine, so that the task engine performs a task flow data deletion operation to generate the new task information and a task flow undone result, outputting the new task information and the task flow undone result to the project task management module by the task engine, so that the project task management module performs a task data deletion operation and generates a task undone result, receiving the task undone result by the display module and performing a display data deletion operation according to the task undone result through the display module to generate the undone result.

5. The method according to claim 4, wherein the task flow data deletion operation is to delete the task flow data associated with the undone data and the historical data by the task engine, wherein the task data deletion operation is to delete data associated with the undone data and the historical data by the project task management module, wherein the display data deletion operation is to delete the display data associated with the undone data and the historical data by the display module.

6. The method according to claim 4, further comprising: storing an undone record, undone operator information, and undone data information by the display module.

\* \* \* \* \*